(12) United States Patent
Horihata et al.

(10) Patent No.: US 10,056,752 B2
(45) Date of Patent: Aug. 21, 2018

(54) ROTARY ELECTRIC MACHINE FOR A VEHICLE

(71) Applicant: DENSO CORPORATION, Kariya, Aichi-pref. (JP)

(72) Inventors: Harumi Horihata, Nagoya (JP); Tadatoshi Asada, Anjo (JP); Takahisa Koyasu, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/274,273

(22) Filed: May 9, 2014

(65) Prior Publication Data

US 2014/0334044 A1 Nov. 13, 2014

(30) Foreign Application Priority Data

May 9, 2013 (JP) ................................. 2013-099019
May 10, 2013 (JP) ................................. 2013-099903
May 10, 2013 (JP) ................................. 2013-099904

(51) Int. Cl.
*H02H 7/06* (2006.01)
*H02H 7/08* (2006.01)
*H02H 5/10* (2006.01)
*H02P 29/024* (2016.01)

(52) U.S. Cl.
CPC .............. *H02H 7/06* (2013.01); *H02H 5/105* (2013.01); *H02P 29/0243* (2016.02); *H02H 7/08* (2013.01)

(58) Field of Classification Search
CPC ...... H02M 1/38; H04W 24/02; H04W 72/042
USPC ................................. 361/20; 310/71; 290/40
See application file for complete search history.

(56) References Cited

U.S. PATENT DOCUMENTS

| 4,059,771 | A | * | 11/1977 | Jacobs | H02J 7/1446 290/44 |
|---|---|---|---|---|---|
| 4,945,277 | A | | 7/1990 | Iwatani et al. | |
| 5,166,852 | A | * | 11/1992 | Sano | H03K 17/0822 340/649 |
| 5,566,852 | A | * | 10/1996 | Emery | A47G 23/06 220/507 |
| 5,568,347 | A | * | 10/1996 | Shirai | H03K 17/0822 361/103 |
| 5,805,396 | A | | 9/1998 | Sado et al. | |
| 6,504,346 | B2 | * | 1/2003 | Nakamura | H02J 7/1492 322/90 |
| 7,096,839 | B2 | | 8/2006 | Nakazawa et al. | |
| 7,129,594 | B2 | | 10/2006 | Iwatani et al. | |
| 7,174,270 | B2 | * | 2/2007 | Kokubo | G01D 5/24452 318/571 |
| 8,541,988 | B2 | * | 9/2013 | Horihata | H02J 7/1461 322/21 |

(Continued)

FOREIGN PATENT DOCUMENTS

JP S64-41646 A 2/1989
JP H03-239129 A 10/1991

(Continued)

*Primary Examiner* — Eduardo Colon Santana
*Assistant Examiner* — Devon Joseph
(74) *Attorney, Agent, or Firm* — Oliff PLC

(57) ABSTRACT

A rotary electric machine for a vehicle is provided. The rotary electric machine includes a power system circuit which has a power element and is grounded via a first ground terminal and a first connecting line and a control system circuit which controls the power system circuit and is grounded via a second ground terminal and a second connecting line.

16 Claims, 8 Drawing Sheets

(56) References Cited

U.S. PATENT DOCUMENTS

| | | | |
|---|---|---|---|
| 8,547,071 B2* | 10/2013 | Horihata | H02P 29/0241 322/21 |
| 8,612,073 B2 | 12/2013 | Fuji et al. | |
| 8,670,904 B2* | 3/2014 | Yoneda | B62D 5/046 180/404 |
| 2001/0024102 A1* | 9/2001 | Egami | B60K 6/22 318/801 |
| 2002/0185992 A1* | 12/2002 | Kouwa | H02J 7/1446 322/28 |
| 2006/0022647 A1* | 2/2006 | Asada | H02J 7/1446 322/28 |
| 2006/0192534 A1* | 8/2006 | Yamauchi | H02P 6/005 322/25 |
| 2007/0164709 A1* | 7/2007 | Tsubaki | H02J 7/0031 320/134 |
| 2008/0023768 A1* | 1/2008 | Alberkrack | H01L 27/0255 257/355 |
| 2008/0246411 A1* | 10/2008 | Yang | H02M 3/335 315/247 |
| 2008/0246441 A1* | 10/2008 | Tsubaki | H02J 7/0031 320/150 |
| 2008/0304189 A1* | 12/2008 | Tang | H02H 7/0838 361/33 |
| 2009/0109588 A1 | 4/2009 | Hayama et al. | |
| 2009/0128157 A1* | 5/2009 | Moriya | G01R 31/3624 324/426 |
| 2009/0240389 A1* | 9/2009 | Nomura | B62D 5/046 701/31.4 |
| 2011/0248803 A1* | 10/2011 | Niimi | F02N 11/087 335/202 |
| 2012/0068671 A1* | 3/2012 | Horihata | H02J 7/1492 322/94 |
| 2013/0249696 A1 | 9/2013 | Ikuta et al. | |
| 2013/0308061 A1* | 11/2013 | Murakami | H02M 3/1582 348/730 |
| 2013/0334934 A1* | 12/2013 | Maeda | H02K 11/0073 310/68 B |
| 2014/0055894 A1* | 2/2014 | Maruyama | H02H 9/04 361/56 |
| 2014/0375153 A1* | 12/2014 | Suzuki | H02K 11/048 310/54 |
| 2014/0375180 A1* | 12/2014 | Suzuki | H02K 11/048 310/68 D |
| 2014/0375282 A1* | 12/2014 | Horihata | H02P 9/009 322/94 |
| 2015/0102782 A1* | 4/2015 | Nakayama | H02H 7/067 322/21 |
| 2015/0188479 A1* | 7/2015 | Asai | H02P 9/48 318/400.13 |

FOREIGN PATENT DOCUMENTS

| | | | | |
|---|---|---|---|---|
| JP | A-07-084655 | 3/1995 | | |
| JP | B2-2504586 | 6/1996 | | |
| JP | H10-289977 A | 10/1998 | | |
| JP | 2001-231268 A | 8/2001 | | |
| JP | 2001-268890 A | 9/2001 | | |
| JP | 2002-010694 A | 1/2002 | | |
| JP | 2005-180386 A | 7/2005 | | |
| JP | A-2006-006006 | 1/2006 | | |
| JP | 2007-195007 A | 8/2007 | | |
| JP | 2008-148498 A | 6/2008 | | |
| JP | 2009232652 A | * | 10/2009 | B60K 6/365 |
| JP | B2-4501873 | 7/2010 | | |
| JP | 2011-120363 A | 6/2011 | | |
| JP | A-2011-254562 | 12/2011 | | |
| JP | 2012120293 A | * | 6/2012 | |
| JP | 2012-210048 A | 10/2012 | | |

* cited by examiner

ROTARY ELECTRIC MACHINE FOR A VEHICLE

CROSS-REFERENCE TO RELATED APPLICATION

This application is based on and claims the benefit of priority from earlier Japanese Patent Applications No. 2013-99019 filed May 9, 2013, No. 2013-99903 filed May 10, 2013, and No. 2013-99904 filed May 10, 2013, the descriptions of which are incorporated herein by reference.

BACKGROUND

Technical Field

The present invention relates to a rotary electric machine for a vehicle, the machine being installed in a passenger car, a truck or the like.

Related Art

Conventionally, a drive circuit is known which includes a protection circuit which logically detects overheat and over current of a power transistor to limit the operation thereof (for example, refer to JP-A-7-84655). This protection circuit prohibits the power transistor from being turned on when overheat or over current of the power transistor is detected which drives a load connected to the drive circuit.

According to the configuration of JP-A-7-84655, when an abnormal condition occurs, the power transistor is turned off to stop supplying current from the power transistor to the load. However, even if the protection circuit of JP-A-7-84655 is applied to the power transistor, which is included in a power converter of the rotary electric machine for a vehicle, current flows through a parasitic diode when the power transistor is turned off. Hence, when a ground terminal is disconnected, the current flowing through the parasitic diode can flow to a control circuit and to another electric load through the control circuit. In particular, when a 48V high-voltage battery is charged from a power system circuit, and a control system circuit is operated by being connected to a 12V low-voltage battery, current is reliably prevented from flowing from the power system circuit to the control system circuit even when the ground terminal is disconnected.

In addition, conventionally, an electronic circuit such as an in-vehicle AC regulator is known which maintains output control in a stable condition by prohibiting an output driver circuit and an output switching element from being driven when disconnection of a ground terminal is detected (for example, refer to Japanese Patent No. 2504586). This electronic circuit stops the control when the ground terminal is disconnected to prevent the output control from being disabled.

However, the function of the electronic circuit of Japanese Patent No. 2504586 cannot be applied to a case where one ground terminal is provided for the whole electronic circuit, and a plurality of ground terminals are individually grounded, and when one of the ground terminals is disconnected. For example, when assuming that a power ground terminal, which is connected to a power converter forming an inverter of a rotary electric machine for a vehicle, and a control ground terminal, which is connected to a controller controlling the power converter, are individually grounded, and the power ground terminal is disconnected, disconnection of the power ground terminal cannot be detected, and elements connected to the power ground terminal cannot be protected.

In addition, conventionally, an abnormality determination apparatus of an electric power unit is known which detects current and voltage of a battery to determine an open fault of the battery (for example, refer to Japanese Patent No. 4501873). This abnormality determination apparatus determines an open fault of the battery when the variation amount of voltage detected by a voltage sensor is larger, and the variation amount of current detected by a current sensor is smaller.

The abnormality determination apparatus of Japanese Patent No. 4501873 determines presence or absence of an open fault of the battery based on a relationship between the voltage and the current of the battery. Hence, a current sensor is required which detects a current flowing through a portion to be an object of the determination of an open fault, thereby complicating the configuration of the abnormality determination apparatus. For example, considering that disconnection of a control ground terminal is detected which grounds a control system circuit of the rotary electric machine for a vehicle, it is difficult to provide a current sensor for detecting the disconnection of the control ground terminal (open fault) because the space for installing the rotary electric machine is limited due to the requirement for miniaturization. In addition, since the amount of current flowing to the control system circuit is relatively small, it is difficult to accurately determine disconnection of the ground terminal based on the relationship between the current and the voltage.

SUMMARY

An embodiment provides a rotary electric machine for a vehicle which can reliably prevent current from flowing from a power system circuit to a control system circuit.

An embodiment provides a rotary electric machine for a vehicle which can detect disconnection of a power ground terminal when the power ground terminal and a control ground terminal are individually grounded.

An embodiment provides a rotary electric machine for a vehicle which can protect an element connected to a power ground terminal.

An embodiment provides a rotary electric machine for a vehicle which can detect disconnection of a control ground terminal by a simple configuration.

As an aspect of the embodiment, a rotary electric machine for a vehicle, the rotary electric machine including: a power system circuit which has a power element and is grounded via a first ground terminal and a first connecting line; and a control system circuit which controls the power system circuit and is grounded via a second ground terminal and a second connecting line.

DETAILED DESCRIPTION OF THE PREFERRED EMBODIMENTS

Figure 1:
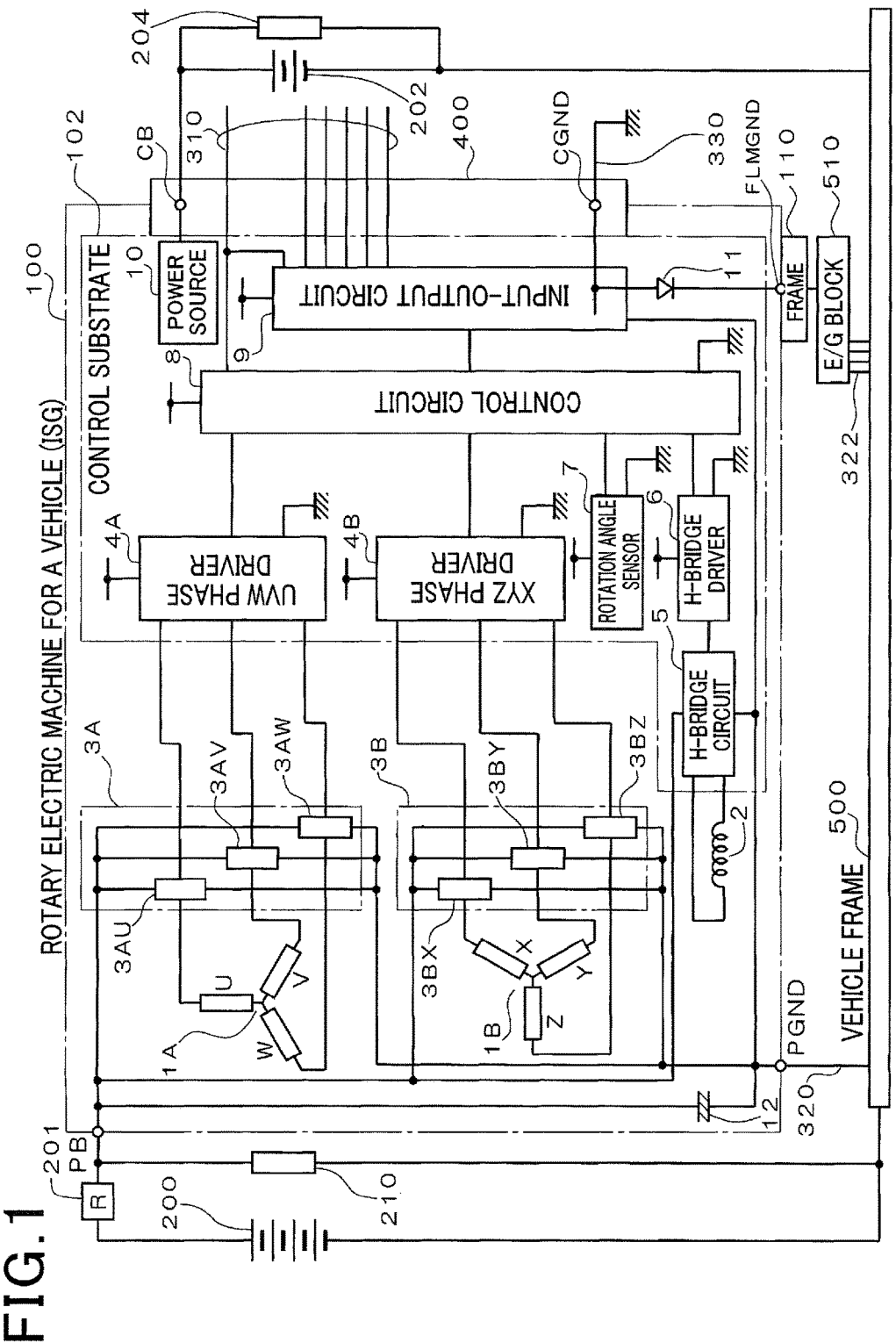
FIG. 1 is a diagram showing a configuration of a rotary electric machine for a vehicle according to an embodiment.

With reference to the accompanying drawings, hereinafter are described embodiments of the present invention. Throughout the drawings, the components identical with or similar to each other are given the same reference numerals for the sake of omitting unnecessary explanation.

First Embodiment

As shown in FIG. 1, a rotary electric machine 100 for a vehicle includes two stator windings 1A, 1B, a field winding 2, two MOS module groups 3A, 3B, a UVW phase driver 4A, an XYZ phase driver 4B, an H-bridge circuit 5, an H-bridge driver 6, a rotation angle sensor 7, a control circuit 8, an input-output circuit 9, a power circuit 10, a diode 11, and a capacitor 12. The rotary electric machine 100 is referred to as an ISG (integrated starter generator), and has a function of an electric motor and a function of a generator.

The stator winding 1A is a three-phase winding including a U-phase winding, a V-phase winding, and a W-phase winding, and is wound around a stator core (not shown). Similarly, the stator winding 1B is a three-phase winding including an X-phase winding, a Y-phase winding, and a Z-phase winding, and is wound around the stator core and at a position displaced 30 electrical degrees with respect to the stator winding 1A. In the present embodiment, the two stator windings 1A, 1B and the stator core configure a stator. Note that each of the numbers of phases of the stator windings 1A, 1B is not limited to three.

The field winding 2 allows a rotor having a rotating shaft, which transfers driving force between the rotor and an engine via a belt or gears, to generate a magnetic field. The field winding 2 is wound around field poles (not shown) to configure the rotor.

The MOS module group 3A is connected to the stator winding 1A, thereby configuring a three-phase bridge circuit as a whole. The MOS module group 3A operates as a power converter which converts AC voltage, which is induced in the stator winding 1A during generator operation, into DC voltage, and converts DC voltage, which is applied from an external unit (high-voltage battery 200) during motor operation, into AC voltage to apply the converted voltage to the stator winding 1A. The MOS module group 3A includes three MOS modules 3AU, 3AV, 3AW corresponding to the number of phases of the stator winding 1A. The MOS module 3AU is connected to the U-phase winding included in the stator winding 1A. The MOS module 3AV is connected to the V-phase winding included in the stator winding 1A. The MOS module 3AW is connected to the W-phase winding included in the stator winding 1A.

Figure 2:
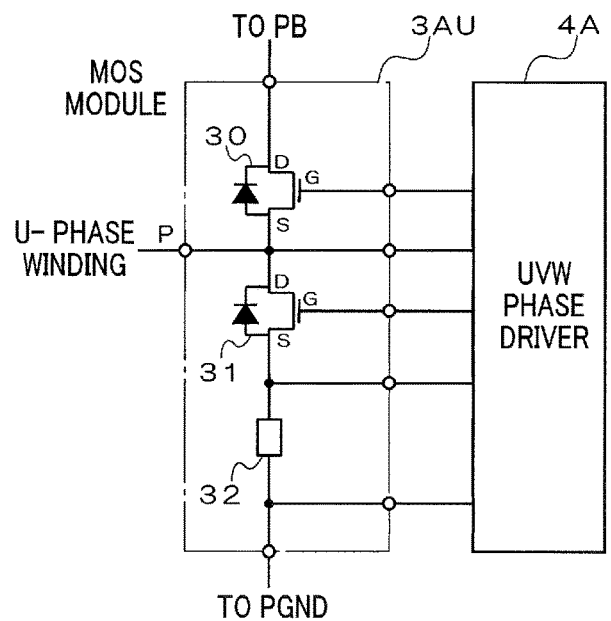
FIG. 2 is a diagram showing a configuration of a MOS module.

As shown in FIG. 2, the MOS module 3AU includes two MOS transistors 30, 31 and a current detection resistor 32. The MOS transistor 30 is a switching element of an upper arm (high side). The source of the MOS transistor 30 is connected to the U-phase winding of the stator winding 1A. The drain of the MOS transistor 30 is connected to a power source terminal PB. The power source terminal PB is connected to, for example, the high-voltage battery 200 (first battery) having a rating of 48 V or a positive terminal of a high-voltage load 210. The MOS transistor 31 is a switching element of a lower arm (low side). The drain of the MOS transistor 31 is connected to the U-phase winding. The source of the MOS transistor 31 is connected to a power ground terminal PGND via the current detection resistor 32. A series circuit consisting of the two MOS transistors 30, 31 is disposed between the positive terminal and the negative terminal of the high-voltage battery 200. The U-phase winding is connected to the connecting point of the MOS transistors 30, 31 via a P terminal. In addition, the gate and the source of the MOS transistor 30, the gate of the MOS transistor 31, and both ends of the resistor 32 are connected to the UVW phase driver 4A.

A diode is connected in parallel between the source and the drain of each of the MOS transistors 30, 31. Although the diode is realized by a parasitic diode (body diode) of the MOS transistors 30, 31, another diode may be connected in parallel as another component. At least one of the upper arm and the lower arm may be configured by using a switching element other than the MOS transistor.

Since the MOS modules 3AV, 3AW other than the MOS module 3AU and MOS modules 3BX, 3BY, 3BZ described later basically have the same configuration, detailed descriptions are omitted.

The MOS module group 3B is connected to the stator winding 1B, thereby configuring a three-phase bridge circuit as a whole. The MOS module group 3B operates as a power converter which converts AC voltage, which is induced in the stator winding 1B during generator operation, into DC voltage, and converts DC voltage, which is applied from an external unit (high-voltage battery 200) during motor operation, into AC voltage to apply the converted voltage to the stator winding 1B. The MOS module group 3B includes three MOS modules 3BX, 3BY, 3BZ corresponding to the number of phases of the stator winding 1B. The MOS module 3BX is connected to the X-phase winding included in the stator winding 1B. The MOS module 3BY is connected to the Y-phase winding included in the stator winding 1B. The MOS module 3BZ is connected to the Z-phase winding included in the stator winding 1B.

The UVW phase driver 4A generates drive signals to be transmitted to the gates of the MOS transistors 30, 31 included in the three MOS modules 3AU, 3AV, 3AW, and detects voltage across the current detection resistor 32. Similarly, the XYZ phase driver 4B generates drive signals to be transmitted to the gates of the MOS transistors 30, 31 included in the three MOS modules 3BX, 3BY, 3BZ, and detects voltage across the current detection resistor 32.

Figure 3:
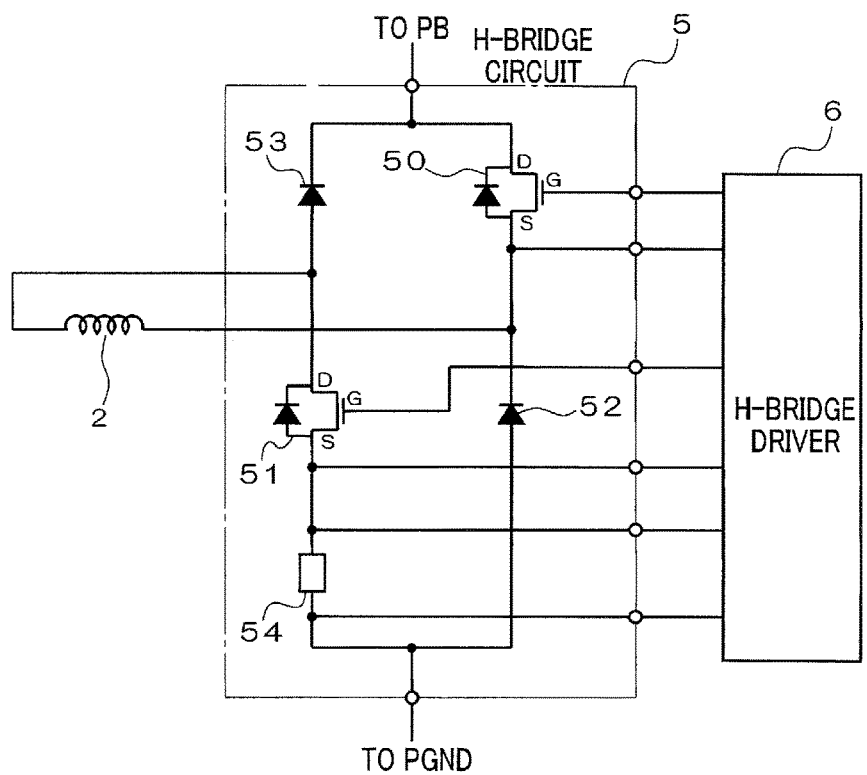
FIG. 3 is a diagram showing a configuration of an H-bridge circuit.

The H-bridge circuit 5 is an exciting circuit which is connected to both ends of the field winding 2 and supplies exciting current to the field winding 2. As shown in FIG. 3, the H-bridge circuit 5 includes two MOS transistors 50, 51, two diodes 52, 53, and a current detection resistor 54. The high-side MOS transistor 50 and the low-side diode 52 are connected in series. One end of the field winding 2 is connected to the connecting point of the MOS transistor 50 and the diode 52. In addition, the high-side diode 53, the low-side MOS transistor 51, and the current detection resistor 54 are connected in series. The other end of the field winding 2 is connected to the connecting point of the diode 53 and the MOS transistor 51. The H-bridge circuit 5 is connected to the power source terminal PB and the power ground terminal PGND. By turning on the MOS transistors 50, 51, exciting current is supplied from the H-bridge circuit 5 to the field winding 2. In addition, by turning off one of the MOS transistors 50, 51, supplying the exciting current is stopped, and the exciting current flowing through the field winding 2 can be circulated through one of the diodes 52, 53.

The H-bridge driver 6 generates drive signals to be transmitted to the gates of the MOS transistors 50, 51 included in the H-bridge circuit 5, and detects voltage across the current detection resistor 54.

The rotation angle sensor 7 detects a rotation angle of the rotor. For example, the rotation angle sensor 7 can be configured by using a permanent magnet and Hall elements. Specifically, by fixing the permanent magnet to an end of the rotating shaft of the rotor and arranging the Hall elements at positions opposed to the permanent magnet to obtain outputs thereof, a rotation angle of the rotor rotating together with the permanent magnet can be detected. Note that the rotation angle sensor 7 may be configured by using elements other than the Hall elements.

The control circuit 8 controls the whole rotary electric machine 100. The control circuit 8 includes an analog-digital converter and a digital-analog converter, and transmits signals to another unit and receives signals from another unit. The control circuit 8 is configured by, for example, a microcomputer. The control circuit 8 executes a predetermined control program for controlling the UVW phase driver 4A, the XYZ phase driver 4B, and the H-bridge driver 6 to operate the rotary electric machine 100 as a motor or a generator or to perform various processes such as abnormality detection and notification.

The input-output circuit 9 performs receiving signals from an external unit and transmitting signals to the external unit via a control harness 310. The input-output circuit 9 performs level conversion of terminal voltage of the high-voltage battery 200 and voltage of the power ground terminal PGND. The input-output circuit 9 is an input-output interface for processing signals and voltage to be transmitted or received. Required functions of the input-output circuit 9 are realized by, for example, a custom IC.

A low-voltage battery 202 (second battery) having a rating of 12 V is connected to the power circuit 10. The power circuit 10 generates operating voltage of 5 V by, for example, by turning on and off a switching element and smoothing the output thereof by a capacitor. Due to the operating voltage, the UVW phase driver 4A, the XYZ phase driver 4B, the H-bridge driver 6, the rotation angle sensor 7, the control circuit 8, and the input-output circuit 9 operate.

The capacitor 12 removes or reduces switching noise generated when turning on or off the MOS transistors 30, 31 such as the MOS module 3AU for motor operation. In FIG. 1, one capacitor 12 is used. However, the number of capacitors can be appropriately changed depending on the magnitude of switching noise.

The UVW phase driver 4A, the XYZ phase driver 4B, the H-bridge circuit 5, the H-bridge driver 6, the rotation angle sensor 7 (except the permanent magnet attached to the rotor), the control circuit 8, and the input-output circuit 9, and the power circuit 10 are mounted on a control substrate 102.

In addition, as shown in FIG. 1, the rotary electric machine 100 includes a connector 400 to which the power source terminal PB, a control source terminal CB, the power ground terminal PGND, a control ground terminal CGND, the control harness 310 and the like are attached. The power source terminal PB is a high-voltage positive electrode side input-output terminal. The high-voltage battery 200 and the high-voltage load 210 are connected to the power source terminal PB via a predetermined cable. The control source terminal CB is a low-voltage positive electrode side input terminal. The low-voltage battery 202 and the low-voltage load 204 are connected to the control source terminal CB via a predetermined cable.

The power ground terminal PGND is a first ground terminal which grounds power system circuits. The power ground terminal PGND is connected to a vehicle frame 500 via a ground harness 320, which is a first connecting line. The MOS module groups 3A, 3B (power converter) and the H-bridge circuit 5 (exciting circuit) are power system circuits. The power system circuits include the MOS transistors 30, 31, 50, 51 which are power elements through which a current common to the stator windings 1A, 1B or the field winding 2 flows.

In addition, the control ground terminal CGND is a second ground terminal which is provided in addition to the power ground terminal PGND and grounds control system circuits. The control ground terminal CGND is grounded via a ground cable 330 (second connecting line) other than the ground harness 320. The diode 11 (whose cathode is positioned at the frame 11 side) is inserted between the control ground terminal CGND and the frame of the rotary electric machine 100 (hereinafter, referred to as "ISG frame") via internal lines of the input-output circuit 9. Specifically, the cathode of the diode 11 is connected to a frame ground terminal FLMGND, which is connected the ISG frame 110. The UVW phase driver 4A, the XYZ phase driver 4B, the H-bridge driver 6, the rotation angle sensor 7, the control circuit 8, the input-output circuit 9 and the like are control system circuits. Note that the ground cable 330 is connected to part of the vehicle which has a ground potential (0 V) and does not have voltage variation. In addition, in FIG. 1, although the diode 11 is provided outside the control substrate 102, the diode 11 may be provided on the control substrate 102.

The connector 400 is used for connect the control harness 310, the ground cable 330 and other cables to terminals (e.g. the control ground terminal CGND and the control source terminal CB) other than the power source terminal PB and the power ground terminal PGND.

The ISG frame 110 of the rotary electric machine 100 is a dielectric formed by, for example, aluminum die-casting. The ISG frame 110 is fixed to an engine (E/G) block 510 by bolts. In addition, the engine block 510 is connected to the vehicle frame 500 by a ground harness 322.

The rotary electric machine 100 of the present embodiment has the configuration as described above. Next, detection operation and protection operation are described which are performed when the ground cable 330 connected to the control ground terminal CGND is disconnected.

In the rotary electric machine 100 of the present embodiment, control system circuits such as the control circuit 8 are grounded via the control ground terminal CGND. The potential of the control ground terminal CGND is fixed to the ground potential via the ground cable 330. The control system circuits perform various operations with reference to the ground potential of the control ground terminal CGND. Hence, if the ground cable 330 is disconnected from the control ground terminal CGND due to vibration or the like, the ground potentials of the control system circuits become unstable, whereby the operation of the control system circuits becomes unstable.

To avoid the above situation, in the present embodiment, the diode 11 is inserted between the control ground terminal CGND and the ISG frame 110 of the rotary electric machine 100. As described above, the ISG frame 110 is fixed to the engine block 510 by the bolts, and the engine block 510 is connected to the vehicle frame 500 via the ground harness 322. Hence, if the ground cable 330 is disconnected from the control ground terminal CGND, the grounding path to the ISG frame 110 through the diode 11 is ensured, whereby temporary operations of the control system circuits are maintained. In addition, since the cathode of the diode 11 is connected to the ISG frame 110, current is prevented from flowing from the power system circuits to the control system circuits via the vehicle frame 500.

Meanwhile, although the grounding path via the diode 11 is ensured, if the ground cable 330 is disconnected, the potential of the control ground terminal CGND becomes higher by the forward voltage (e.g. 0.7 V) of the diode 11. Since operation margins of the control system circuits become smaller as the potential of the control ground terminal CGND increases, it is desirable to notify occurrence of a malfunction, that is, disconnection of the ground cable 330 from the control ground terminal CGND to the driver, to prompt the driver to quickly take measures, such as inspection, repair and replacement. In addition, as a premise, it is desirable to detect the disconnection of the ground cable 330. Hence, the control circuit 8 includes a notification means which notifies the detected disconnection of the ground cable 330 to an external unit (e.g. an ECU 600).

Note that disconnection of the ground cable 330 includes a state where the contact resistance becomes higher than an assumed acceptable value due to loosing nuts for connection, in addition to a state where one end of the ground cable 330 is completely separated from the control ground terminal CGND, and a state where not only one end of the ground cable 330 at the control ground terminal CGND side but also the other end of the ground cable 330 at the vehicle side is completely separated.

Figure 4:
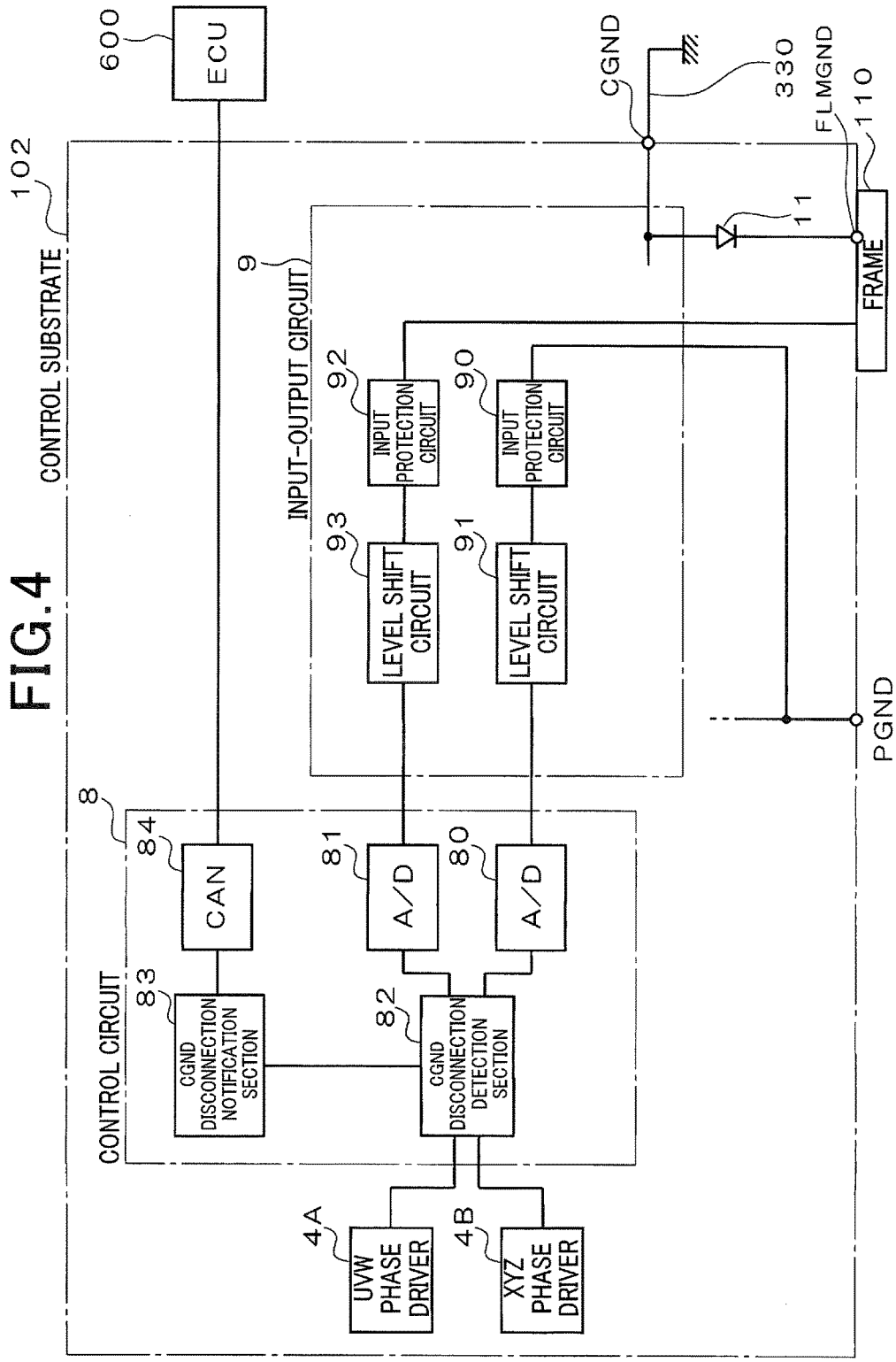
FIG. 4 is a diagram showing a configuration performing a detection operation and a notification operation.
Figure 5:
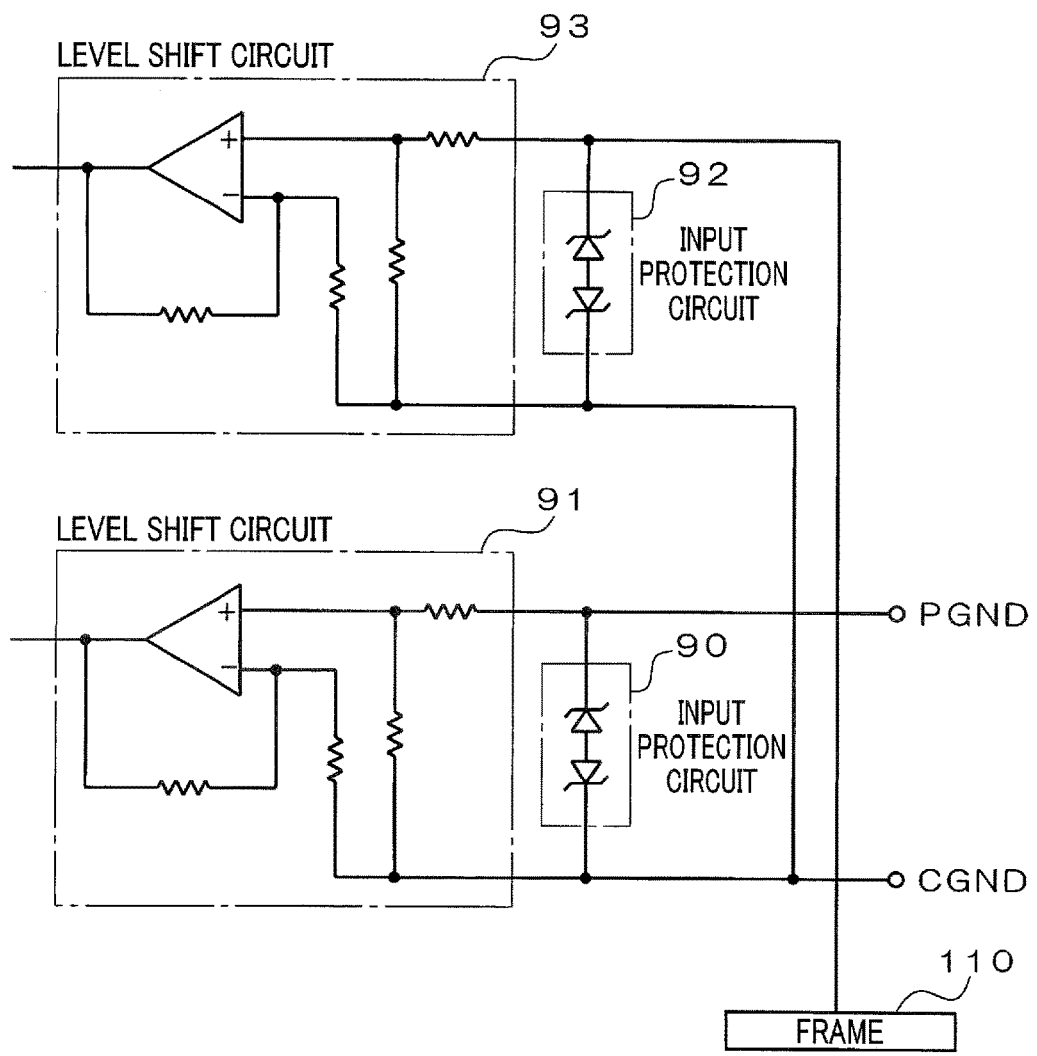
FIG. 5 is a diagram showing a concrete example of an input protection circuit and a level-shift circuit.

To perform the detection operation and the notification operation described above, the rotary electric machine 100 of the present embodiment includes the configuration shown in FIG. 4. That is, the input-output circuit 9 includes an input protection circuit 90 and a level shift circuit 91 connected to the power ground terminal PGND, an input protection circuit 92 and a level shift circuit 93 connected to the ISG frame 110. FIG. 5 shows a concrete example of the input protection circuits 90, 92 and the level shift circuits 91, 93.

The input protection circuit 90 restrains a variation range of the voltage of the power ground terminal PGND so as to be constant when the variation of the voltage has become larger. For example, as shown in FIG. 5, the input protection circuit 90 includes a Zener diode whose cathode is disposed at the power ground terminal PGND side, and a Zener diode whose cathode is disposed at the control ground terminal CGND side, which are connected in series. Note that the input protection circuit 90 is configured by combining Zener diodes, the number of which is required for restraining variation of the potential of the power ground terminal PGND within a predetermined voltage range. For example, if the predetermined voltage range is set to 0 V±2.1 V, three Zener diodes directed to one direction and three Zener diodes directed to the other direction, that is, six Zener diodes may be connected in series.

When the level shift circuit 91 monitors the potential of the power ground terminal PGND with reference to the potential of the control ground terminal CGND, the level shift circuit 91 converts the potential of the control ground terminal CGND to the potential suitable to monitor the potential of the power ground terminal PGND. In the embodiment, to monitor the potential of the power ground terminal PGND within the voltage range from −1.3 V to +0.6 V (the ground of this voltage range is described later), a level shift is performed so that the voltage range becomes, for example, 2.5 V±1.0 V, considering that operation voltage used in control system circuits is 5 V. For example, as shown in FIG. 5, the level shift circuit 91 is configured by combining an operational amplifier and a plurality of resistors.

Similarly, the input protection circuit 92 restrains a variation range of the voltage of the ISG frame 110 so as to be constant when the variation of the voltage (to be exact, variation of the voltage of a terminal to be connected to the ISG frame 110) has become larger. For example, as shown in FIG. 5, the input protection circuit 92 includes a Zener diode whose cathode is disposed at the power ground terminal PGND side, and a Zener diode whose cathode is disposed at the control ground terminal CGND side, which are connected in series.

When the level shift circuit 92 monitors the potential of the ISG frame 110 with reference to the potential of the control ground terminal CGND, the level shift circuit 92 converts the potential of the control ground terminal CGND to the potential suitable to monitor the potential of the ISG frame 110. In the embodiment, to monitor the potential of the ISG frame 110 within the voltage range from −0.7 V to 0 V (the ground of this voltage range is described later), a level shift is performed so that the voltage range becomes, for example, 2.5 V±1.0 V, considering that operation voltage used in control system circuits is 5 V. For example, as shown in FIG. 5, the level shift circuit 92 is configured by combining an operational amplifier and a plurality of resistors.

In addition, the control circuit 8 includes analog-digital converters (A/D) 80, 81, a CGND disconnection detection section 82, a CGND disconnection notification section 83, a CAN (Controller Area Network) control section 84.

The analog-digital converter 80 converts output voltage of the level shift circuit 91 to digital data. The analog-digital converter 81 converts output voltage of the level shift circuit 93 to digital data. The CGND disconnection detection section 82 monitors voltage of the control ground terminal CGND or the ISG frame 110 (the potential of the power ground terminal PGND or the ISG frame 110 with reference to the potential of the control ground terminal CGND) based on the data outputted from the analog-digital converters 80, 81. If the voltage meets a predetermined condition, the CGND disconnection detection section 82 detects disconnection of the ground cable 330 connected to the control ground terminal CGND. The CGND disconnection detection section 82 corresponds to a connecting line disconnection detection section.

The CGND disconnection notification section 83 is a notification means which, when the CGND disconnection detection section 82 has detected the disconnection of the ground cable 330, transmits notification of the detection to the ECU 600. For example, this notification can be transmitted to the ECU 600 by CAN communication using the CAN protocol realized by the CAN control section 84. Note that another communication method such as LIN (Local Interconnect Network) communication using the LIN protocol may be used.

Next, a concrete operation for detecting disconnection of the ground cable 330 from the control ground terminal CGND is described. For example, in the present embodiment, the maximum value of input and output current flowing during motor operation and generator operation of the rotary electric machine 100 is set to 200 A. In addition, the maximum value of contact resistance of the power ground terminal PGND (including resistance of the ground harness 320 and the like) is set to 3 mΩ. Note that, in the above, although examples of the maximum value of the input and output current and the maximum value of contact resistance of the power ground terminal PGND are shown, the maximum values are appropriately changed according to actual products.

Figure 6:
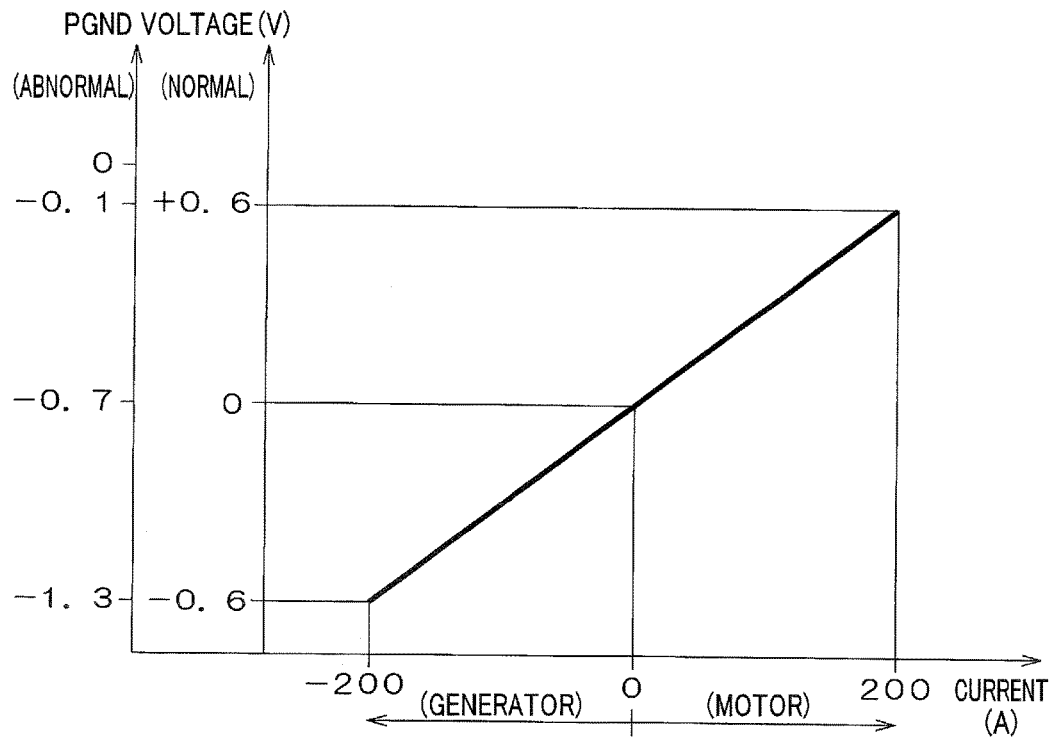
FIG. 6 is a diagram showing voltage variation of a power ground terminal with reference to the potential of a control ground terminal.

The voltage of the power ground terminal PGND when the rotary electric machine 100 is stopped (voltage with reference to the potential of the control ground terminal CGND) is set to 0 V. The current flowing to the power ground terminal PGND during motor operation is set to be positive side. In this case, voltage variation of the power ground terminal PGND is shown in FIG. 6.

That is, during normal time (normal operation) when the power ground terminal PGND and the control ground terminal CGND are not disconnected, the voltage of the power ground terminal PGND varies within a range from 0 to +0.6 V corresponding to the current 0 to 200 A during motor operation. In addition, the voltage of the power ground terminal PGND varies within a range from −0.6 to 0 V corresponding to the current 0 to 200 A during generation operation.

Meanwhile, during abnormal time (abnormal operation) when the ground cable 330 is disconnected from the control ground terminal CGND, the potential of the control ground terminal CGND increases by 0.7 V, which is the forward voltage of the diode 11, thereby becoming +0.7 V. In this case, the voltage of the ISG frame 110 with reference to the potential of the control ground terminal CGND changes from 0 V of the normal time to −0.7 V. In addition, since the voltage of the power ground terminal PGND is detected with reference to the potential of the control ground terminal CGND which has become +0.7 V, during this abnormal time, the voltage of the power ground terminal PGND varies within a range from −0.7 to −0.1 V, corresponding to the current 0 to 200 A of motor operation. In addition, corresponding to the current 0 to 200 A of generation operation, the voltage of the power ground terminal PGND varies within a range from −1.3 to −0.7 V.

As described above, if ground cable 330 is disconnected from the control ground terminal CGND, (A) the voltage of the ISG frame 110 changes from 0 V to −0.7 V, and (B) the voltages of the power ground terminal PGND of motor operation and generation operation shift to the 0.7 V lower side compared with those of normal time. The CGND disconnection detection section 82 uses at least one of the conditions (A) and (B) for detecting disconnection of the control ground terminal CGND.

Figure 7:
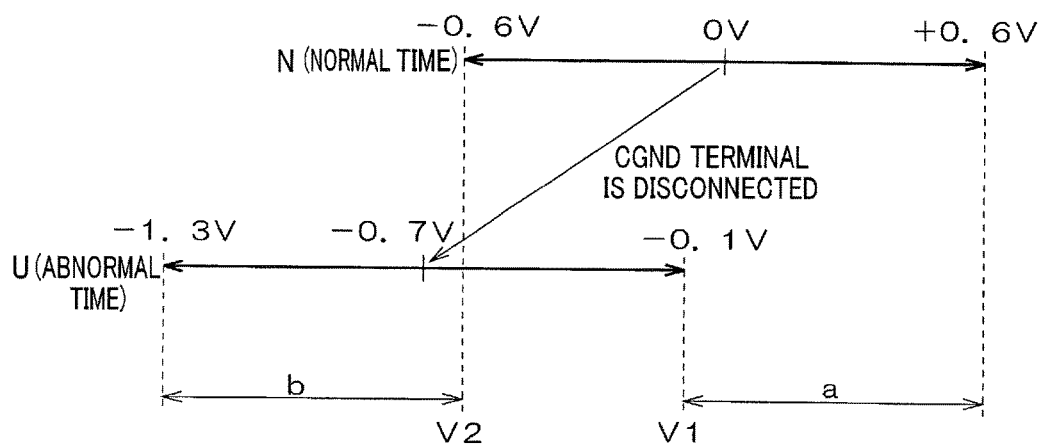
FIG. 7 is a diagram for explaining variation of power ground terminal voltage obtained when the control ground terminal is disconnected.

Regarding the condition (B), a measure is requires for the change of the voltage of the power ground terminal PGND which shifts to the 0.7 V lower side compared with that of normal time. In FIG. 7, N shows a voltage range (−0.6 to +0.6 V) of the power ground terminal PGND during normal time. U shows a voltage range (−1.3 to −0.6 V) of the power ground terminal PGND during abnormal time when the control ground terminal CGND is disconnected. As clearly shown in FIG. 7, when an abnormal condition occurs, the voltage of the power ground terminal PGND (B1) does not increase to a range a of −0.1 to +0.6 V, and (B2) may decrease to a range b of −1.3 to −0.6 V.

Regarding (B1), the CGND disconnection detection section 82 may confirm that, for example, when a reference voltage V1 is set to −0.1 V, the voltage of the power ground terminal PGND does not exceed the reference voltage V1 during motor operation. Note that as the current flowing through the power ground terminal PGND during motor operation is higher, this confirmation can be done more easily and correctly. For example, when wheels of the vehicle are driven by the rotary electric machine 100, the rotary electric machine 100 becomes an almost full power state during motor operation. Hence, the above confirmation is preferably done during the motor operation. In addition, the reference voltage V1 is not necessarily −0.1 V, and may be more than −0.1 V.

Regarding (B2), the CGND disconnection detection section 82 may confirm that, for example, when a reference voltage V2 is set to −0.6 V, the voltage of the power ground terminal PGND has decreased below the reference voltage V2 during generation operation. Note that as the current flowing through the power ground terminal PGND increases during generation operation, this confirmation can be done more easily and correctly. For example, when regenerative braking is performed by generation operation of the rotary electric machine 100, relatively high current flows. Hence, the above confirmation is preferably done during the generation operation. Alternatively, the above confirmation may be done when it is confirmed that generated current is higher (the whole generated current can be detected by summing the currents flowing to the MOS modules) or that adjusting voltage is higher during generation operation. In addition, the reference voltage V2 is not necessarily −0.6 V, and may be less than −0.6 V. Note that confirmation is not necessarily done that both the above (B1) and (B2) are met. Confirmation of one of the above (B1) and (B2) may be done. Confirmation of both the above (B1) and (B2) may be done. In this case, when one of the (B1) and (B2) is met, determination may be done that a terminal is disconnected.

As described above, according to the rotary electric machine 100 for a vehicle of the present embodiment, the power ground terminal PGND for grounding power system circuits and the control ground terminal CGND for grounding control system circuits are separated. Hence, even when the power ground terminal PGND and the control ground terminal CGND are disconnected, current is reliably prevented from flowing from the power system circuit to the control system circuit.

In addition, the frame ground terminal FLMGND (power ground terminal PGND) and the control ground terminal CGND are connected via the diode 11 which are disposed so as to interrupt the current flowing from the frame ground terminal FLMGND to the control ground terminal CGND. Hence, when the control ground terminal CGND is disconnected, the current flowing from the power system circuit to the control system circuit via the power ground terminal PGND and the frame ground terminal FLMGND can be interrupted. In addition, connecting the control ground terminal CGND to the frame ground terminal FLMGND via the diode 11 can prevent the potential of the frame ground terminal FLMGND from being unstable when the control ground terminal CGND is disconnected.

In addition, the power ground terminal PGND is connected to the vehicle frame 500. The control ground terminal CGND is connected to an ISG frame 110 via the diode 11 and the frame ground terminal FLMGND. Specifically, the diode 11 is connected to the vehicle frame 500 via the ISG frame 110 and engine block 510. Hence, in the rotary electric machine 100, since the power ground terminal PGND and the control ground terminal CGND are completely separated, the ground terminal can be separately grounded. In addition, when the control ground terminal CGND is disconnected, the control ground terminal CGND can be indirectly connected to the vehicle frame 500 via the diode 11 and the frame ground terminal FLMGND to continue the operation of control system circuits.

In addition, the power system circuits are connected to the high-voltage battery 200 and the high-voltage load 210. The control system circuits are connected to the low-voltage battery 202 and the low-voltage load 204. Hence, when the power ground terminal PGND and the control ground terminal CGND are disconnected, current is reliably prevented from flowing to not only the control system circuits but also the low-voltage loads.

It will be appreciated that the present invention is not limited to the configurations described above, but any and all modifications, variations or equivalents, which may occur to those who are skilled in the art, should be considered to fall within the scope of the present invention.

For example, in the above embodiment, the rotary electric machine 100 for a vehicle operating as ISG is described. However, the present invention can be applied to a rotary electric machine for a vehicle which performs one of motor operation and generation operation.

In addition, in the above embodiment, the disconnection of the ground cable 330 connected to the control ground terminal CGND is detected, which is notified. In parallel, it is desirable to detect the disconnection of the ground harness 320 connected to the power ground terminal PGND to perform predetermined protection operation and notification operation. Hence, for example, a PGND disconnection detection section, a stator winding short circuit control section, an H-bridge off control section, and a PGND disconnection notification section are added to the control circuit 8.

The PGND disconnection detection section monitors voltage of the power ground terminal PGND (potential of the power ground terminal PGND with reference to the potential of the control ground terminal CGND). For example, if the voltage of the power ground terminal PGND is not within the range of 0 V±1.4 V, the PGND disconnection detection section detects the disconnection of the ground harness 320.

If the disconnection of the ground harness 320 is detected by the PGND disconnection detection section, the stator winding short circuit control section sends an instruction to the UVW phase driver 4A and the XYZ phase driver 4B to perform protection operation for short-circuiting the phase windings included in the stator windings 1A, 1B. Specifically, as the protection operation, the UVW phase driver 4A and the XYZ phase driver 4B turn off all the high-side MOS transistors 30 of the MOS module 3AU and the like, and turn on all the low-side MOS transistors 31 of the MOS module 3AU and the like. Note that it is desirable that the MOS transistors 30, 31 are turned on and off at the timing when current is not flowing to the MOS transistors 30, 31 based on the position of the rotor detected by the rotation angle sensor 7.

If the disconnection of the ground harness 320 is detected by the PGND disconnection detection section, the H-bridge off control section sends an instruction to the H-bridge driver 6 to perform protection operation for stopping supply of exciting current to the field winding 2. Specifically, as the protection operation, at least one of the MOS transistors 50, 51 of the H-bridge circuit 5 is turned off by the H-bridge driver 6 to stop the supply of exciting current to the field winding 2.

When the disconnection of the ground harness 320 is detected by the PGND disconnection detection section, the PGND disconnection notification section transmits notification of the detected disconnection of the ground harness 320 to the ECU 600. If a relay 201 serving as a blocking mechanism is provided between the rotary electric machine 100 and the high-voltage battery 200, the ECU 600, which receives the notification, can operate the relay 201 to block the power supply path. Hence, elements connected to the power ground terminal PGND can be reliably protected from the damage due to the application of high voltage. In addition, since the ECU 600 can notify occurrence of abnormality to the driver, the driver can quickly take measures, such as inspection, repair and replacement.

Figure 8:
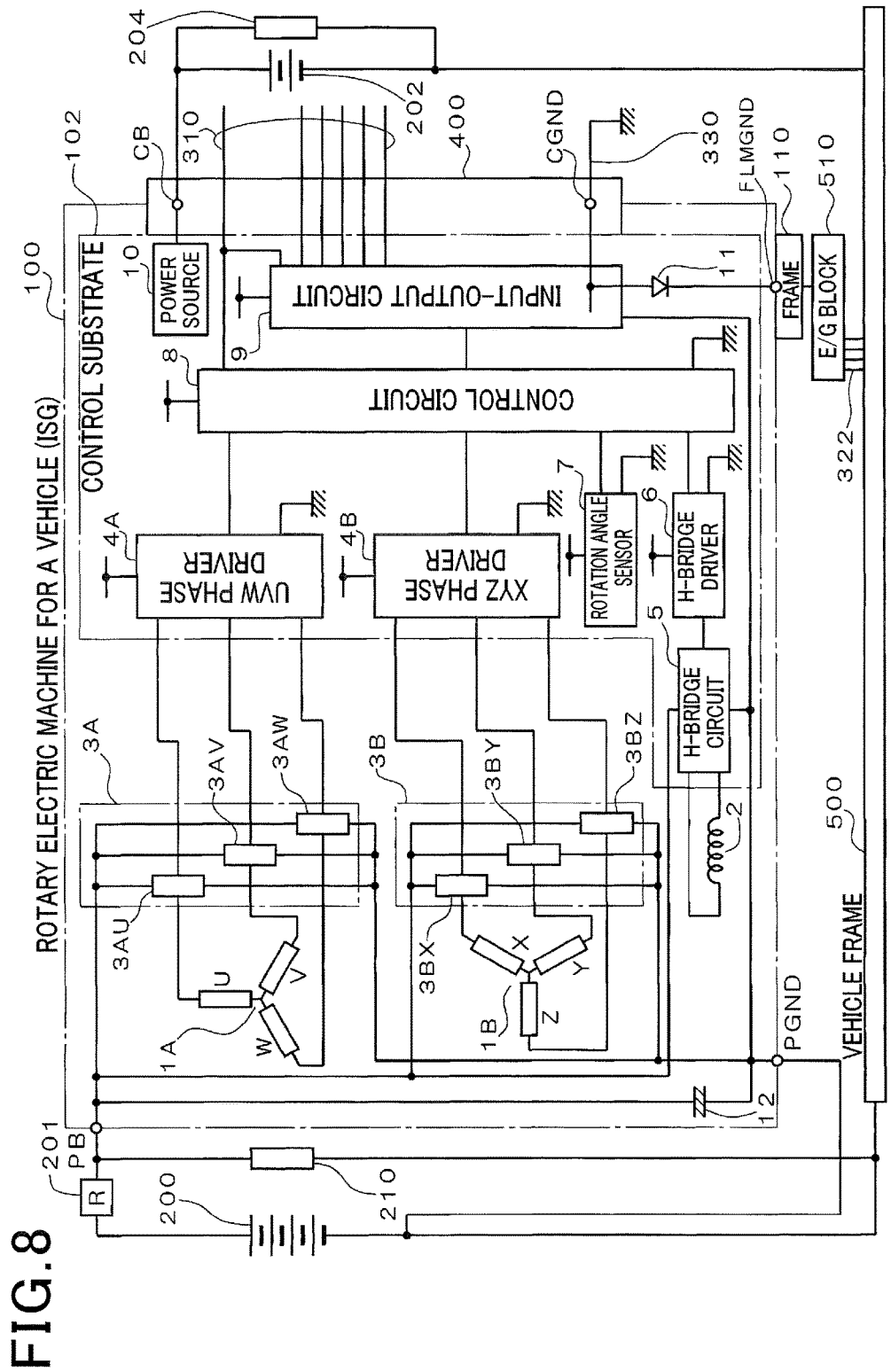
FIG. 8 is a diagram showing a modification of connection concerning the power ground terminal.

In the above embodiment, a case is described where the power ground terminal PGND is connected to the vehicle frame 500 via the ground harness 320. However, as shown in FIG. 8, the ground harness which connects the vehicle frame 500 and the negative electrode terminal of the high-voltage battery 200 may branch, so as to also connect to the power ground terminal PGND.

Figure 9:
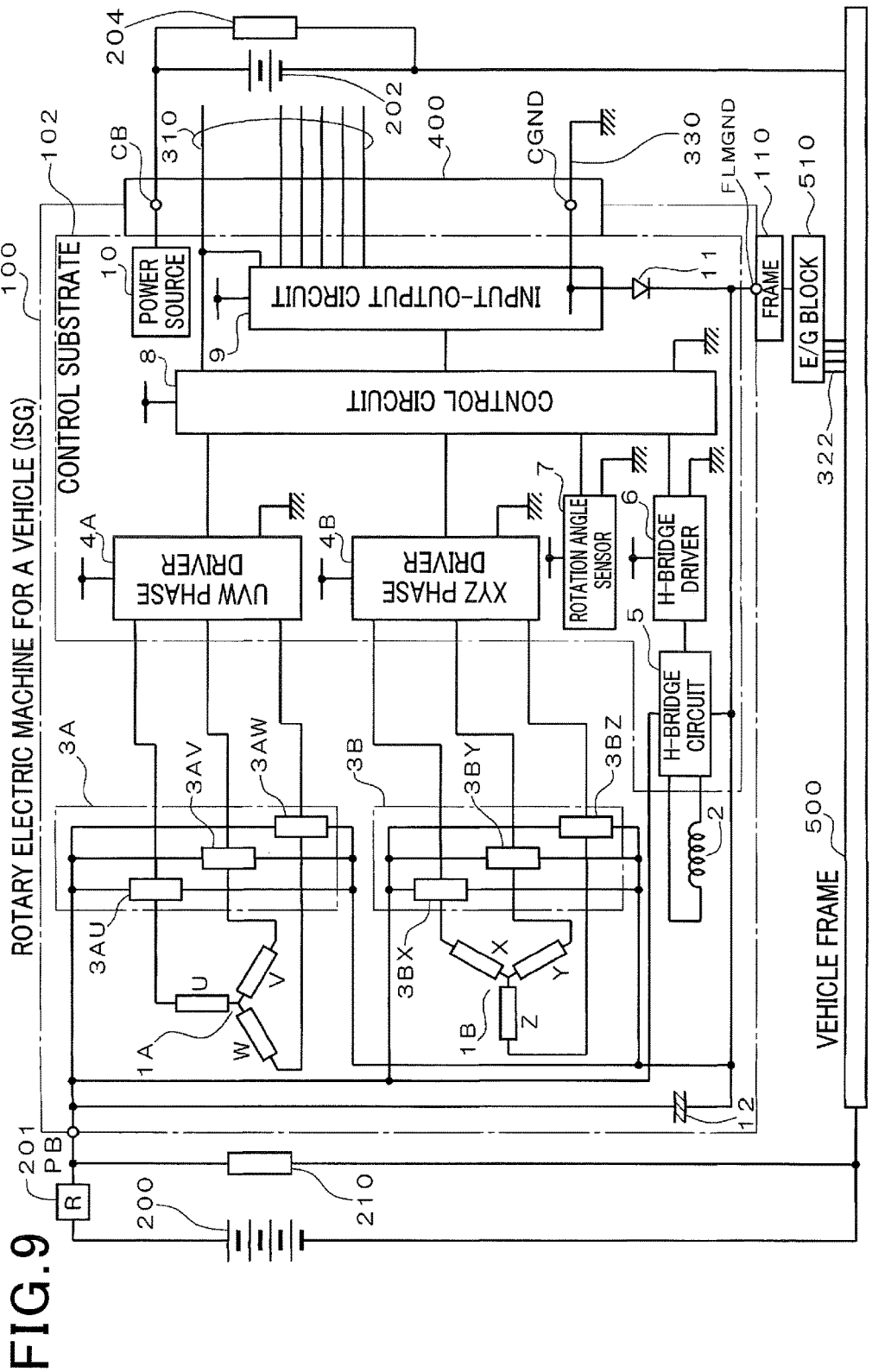
FIG. 9 is a diagram showing another modification of connection concerning the power ground terminal.

Instead of providing the power ground terminal PGND exposing to the outside of the rotary electric machine 100, as shown in FIG. 9, internal lines, which have been connected to the power ground terminal PGND may be connected to the frame ground terminal FLMGND. Since the frame ground terminal FLMGND is indirectly connected to the vehicle frame 500 via the engine block 510 and the like, various power system circuits can be grounded as in the case of providing the power ground terminal PGND.

As described above, according to the present embodiment, the first ground terminal for grounding power system circuits and the second ground terminal for grounding control system circuits are separated. Hence, even when the first ground terminal or the second ground terminal is disconnected, current is reliably prevented from flowing from the power system circuit to the control system circuit.

Second Embodiment

The rotary electric machine 100 of the second embodiment has the same configuration as that of the rotary electric machine 100 described in the first embodiment.

Hereinafter, detection operation and protection operation are described which are performed when the ground harness 320 connected to the power ground terminal PGND is disconnected.

In the present embodiment, the potential of the power ground terminal PGND is monitored with reference to the potential of the control ground terminal CGND. If the potential difference between the power ground terminal PGND and the control ground terminal CGND exceeds a first voltage range, the disconnection of the ground harness 320 is detected.

Note that the "disconnection of the ground harness 320" includes a state where the contact resistance becomes higher than an assumed acceptable value due to loosing nuts for connection, in addition to a state where one end of the ground harness 320 is completely separated from the power ground terminal PGND, and a state where not only one end of the ground harness 320 at the power ground terminal PGND side but also the other end of the ground harness 320 is completely separated from the vehicle frame 500.

In addition, a first protection means, which short-circuits the phase windings included in the stator windings 1A, 1B when the disconnection of the ground harness 320 is detected, and a second protection means, which stops supplying an exciting circuit to the field winding 2 are provided. Hence, high voltages are restrained from being generated in the phase windings of the stator windings 1A, 1B, thereby protecting elements connected to the power ground terminal PGND from the damage due to the application of high voltage.

In addition, at least one (preferably, both of) the power system circuit and the control system circuit is provided with an input protection circuit which restrains the voltage variation of the power ground terminal PGND within a second voltage range wider than the first voltage range so that internal circuits are not damaged due to the variation of the potential of the line connected to the power ground terminal PGND. Hence, the elements connected to the power ground terminal PGND is protected from the damage due to the application of high voltage.

In addition, the control circuit 8 includes a notification means which notify the detected disconnection of the ground harness 320 to an external unit (e.g. the ECU 600). If the relay 201 serving as a blocking mechanism is provided between the rotary electric machine 100 and the high-voltage battery 200, the ECU 600, which receives the notification, can operate the relay 201 to block the power supply path. Hence, elements connected to the power ground terminal PGND can be reliably protected from the damage due to the application of high voltage. In addition, since the ECU 600 can notify occurrence of abnormality to the driver, the driver can quickly take measures, such as inspection, repair and replacement.

Figure 10:
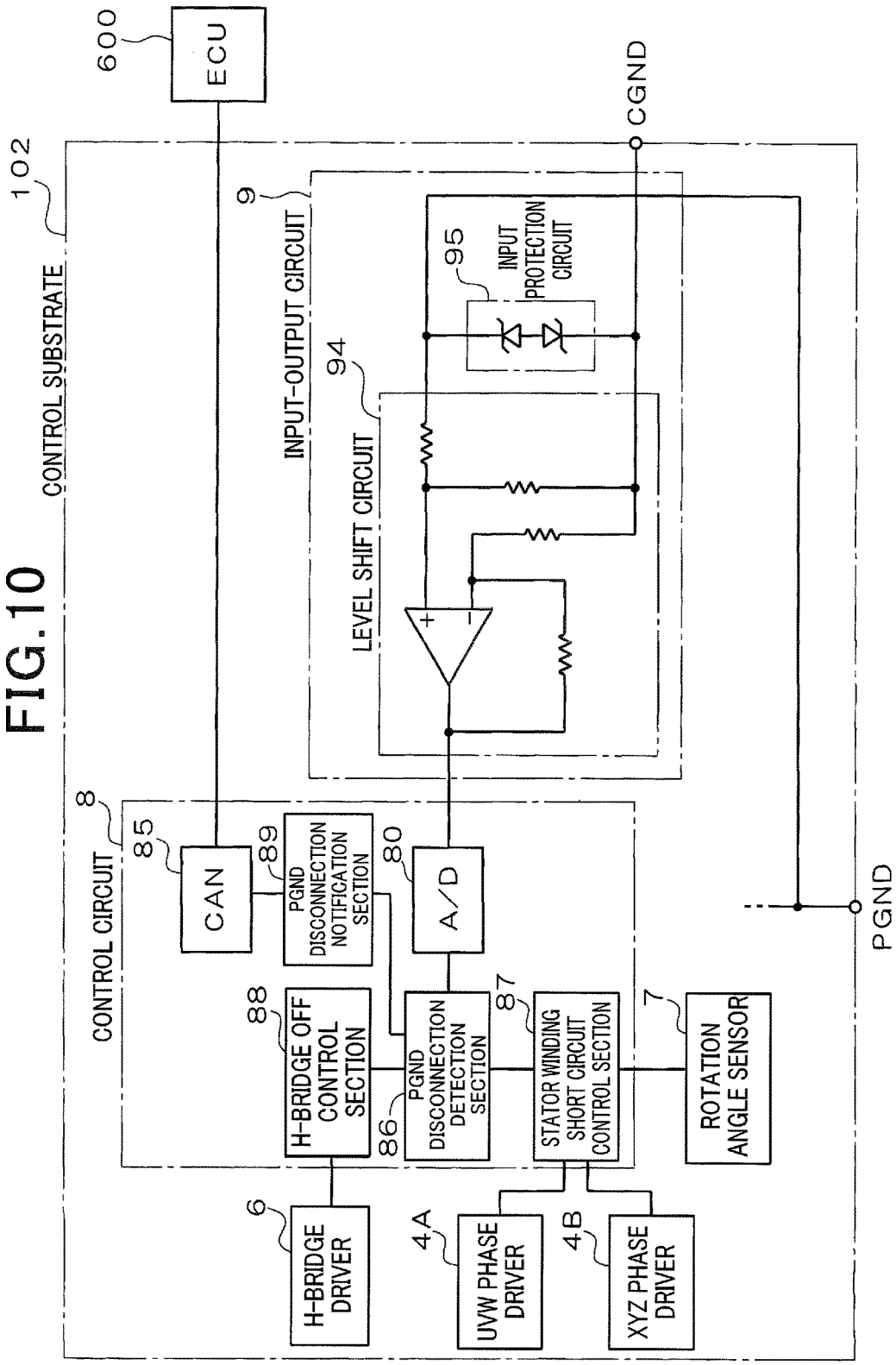
FIG. 10 is a diagram showing a configuration for performing detection operation and protection operation.

To perform the above described detection operation and protection operation, the configuration shown in FIG. 10 is provided. That is, an input-output circuit 9 includes a level shift circuit 94, which performs a level shift for the voltage between the power ground terminal PGND and the control ground terminal CGND, and an input protection circuit 95, which restrains the voltage variation of the power ground terminal PGND within the second voltage range when the voltage variation of the power ground terminal PGND has become higher.

When the level shift circuit 94 monitors the potential of the power ground terminal PGND with reference to the potential of the control ground terminal CGND, the level shift circuit 94 converts the potential of the control ground terminal CGND to the potential suitable to monitor the potential of the power ground terminal PGND. In the present embodiment, the first voltage range used for detecting the disconnection of the ground harness 320 is set to 0 V±1.4 V. Considering that operation voltage used in the control system circuit is 5 V, the level shift is performed so that the range becomes, for example, 2.5 V±1.0 V.

The input protection circuit 95 includes a Zener diode, whose cathode is disposed at the power ground terminal PGND side, and a Zener diode, whose cathode is disposed at the control ground terminal CGND side, which are connected in series. Note that the input protection circuit 95 is configured by combining Zener diodes, the number of which is required for restraining variation of the potential of the power ground terminal PGND within the second voltage range wider than the first voltage range (0 V±1.4 V). For example, if the second voltage range is set to 0 V±2.1 V, three Zener diodes directed to one direction and three Zener diodes directed to the other direction, that is, six Zener diodes may be connected in series.

In addition, the control circuit 8 includes an analog-digital converter (A/D) 80, a PGND disconnection detection section 86, a stator winding short circuit control section 87, a H-bridge off control section 88, a PGND disconnection notification section 89, and a CAN (Controller Area Network) control section 85.

The analog-digital converter 80 converts output voltage of the level shift circuit 94 to digital data. The PGND disconnection detection section 86 monitors voltage of the power ground terminal PGND (the potential of the power ground terminal PGND with reference to the potential of the control ground terminal CGND) based on the data outputted from the analog-digital converters 80. If the voltage is not within the range of 0 V±1.4 V, the PGND disconnection detection section 86 detects the disconnection of the ground harness 320. The PGND disconnection detection section 86 corresponds to a connecting line disconnection detection section.

The stator winding short circuit control section 87 is the first protection means. If the disconnection of the ground harness 320 is detected by the PGND disconnection detection section 86, the stator winding short circuit control section 87 sends an instruction to the UVW phase driver 4A and the XYZ phase driver 4B to perform protection operation for short-circuiting the phase windings included in the stator windings 1A, 1B. Specifically, as the protection operation, the UVW phase driver 4A and the XYZ phase driver 4B turn off all the high-side MOS transistors 30 of the MOS module 3AU and the like, and turn on all the low-side MOS transistors 31 of the MOS module 3AU and the like.

Note that it is desirable that the MOS transistors 30, 31 are turned on or off at the timing when current is not flowing to the MOS transistors 30, 31 based on the position of the rotor detected by the rotation angle sensor 7.

The H-bridge off control section 88 is a second protection section. If the disconnection of the ground harness 320 is detected by the PGND disconnection detection section 86, the H-bridge off control section 88 sends an instruction to the H-bridge driver 6 to perform protection operation for stopping supply of exciting current to the field winding 2. Specifically, as the protection operation, at least one of the MOS transistors 50, 51 of the H-bridge circuit 5 is turned off by the H-bridge driver 6 to stop the supply of exciting current to the field winding 2.

The PGND disconnection notification section 89 is a notification means. When the disconnection of the ground harness 320 is detected by the PGND disconnection detection section 86, the PGND disconnection notification section 89 transmits notification of the detected disconnection of the ground harness 320 to the ECU 600. For example, this notification can be transmitted to the ECU 600 by CAN communication using the CAN protocol realized by the CAN control section 85. Note that another communication method such as LIN (Local Interconnect Network) communication using the LIN protocol may be used.

As described above, according to the rotary electric machine 100 for a vehicle of the present embodiment, the potential of the power ground terminal PGND grounding power system circuits is monitored with reference to the potential of the control ground terminal CGND grounding the control system circuits. Hence, even when the power ground terminal PGND and the control ground terminal CGND are separately grounded, the disconnection of the power ground terminal PGND can be detected.

In addition, the control circuit 8 includes the stator winding short circuit control section 87 which is the first protection means for short-circuiting the phase windings included in the stator windings 1A, 1B when the ground harness 320 is disconnected. Hence, even when the ground harness 320 is disconnected, high voltage is prevented from being generated in the stator windings 1A, 1B, thereby protecting the elements (e.g. an operational amplifier included in the level shift circuit 94 shown in FIG. 10)

connected to the power ground terminal PGND from the damage due to the application of high voltage.

Specifically, by turning off the high-side MOS transistors 30 of the MOS module 3AU and the like, and turning on the low-side MOS transistors 31 of the MOS module 3AU and the like to short circuit the stator windings 1A, 1B, currents flowing to the stator windings 1A, 1B can be circulated, thereby restraining high voltage from being applied to units provided outside the stator windings 1A, 1B.

In addition, the control circuit 8 includes the H-bridge off control section 88 which is the second protection means which stops the supply of exciting current to the field winding 2 when the ground harness 320 is disconnected. Hence, the amount of short-circuit current flowing to a short circuit by the first protection means can be decreased. If the supply of exciting current is not stopped, the current obtained by dividing electromotive force by short circuit impedance continues flowing. Specifically, since resistance of the stator windings 1A, 1B is determined so as to be smaller with a focus on improving efficiency, the resistance of the stator windings 1A, 1B is, for example, only about 100 mΩ. If the electromotive force is 48 V or more, and the source-drain voltage of the MOS transistors 30, 31 is 0.1 V, (48 V−0.1×2)/100 mΩ=478 A is obtained. Hence, the current flows which is twice or higher than that flowing in normal time. As a result, hardware (the MOS transistors 30, 31 and lines) may not withstand. Hence, it is required to short-cut the stator windings 1A, 1B so that voltage is not applied to the power ground terminal PGND, and not to suddenly demagnetize the rotor.

Note that although providing both the stator winding short circuit control section 87 and the H-bridge off control section 88, which are the first and second protection means, can obtain the greatest protection effect, one of the first and second protection means may be provided.

In addition, by providing the input protection circuit 95 (FIG. 10) which restrains variation of the potential of the line connected to the power ground terminal PGND, elements connected to the power ground terminal PGND can be reliably protected even when the ground harness 320 is disconnected.

In addition, the first voltage range, which is used for detecting the disconnection of the ground harness 320 by the PGND disconnection detection section 86, is set to the range of ±1.4 V with reference to the potential of the control ground terminal CGND. Hence, since the withstand voltage of elements connected to the power ground terminal PGND is not required to be higher than necessary, the elements and peripheral circuits thereof can be decreased in size, which can decrease manufacturing cost.

In addition, when the disconnection of the ground harness 320 is detected by the PGND disconnection detection section 86, the PGND disconnection notification section 89 transmits notification of the detected disconnection of the ground harness 320 to the ECU 600. Hence, the ECU 600 can perform protection operations, such as blocking the power supply path. In addition, measures such as inspection, repair and replacement can be quickly taken.

In addition, the MOS module groups 3A, 3B and the like are connected to the high-voltage battery 200. The control system circuits such as the input-output circuit 9 are connected to the low-voltage battery 202 different from the high-voltage battery 200. Hence, stable operation of the control system circuits can be maintained even when the potential of the power ground terminal PGND varies due to the disconnection of the ground harness 320. Specifically, by separating the operation of high-voltage power system circuits and low-voltage control system circuits, stable operation of the control system circuits can be maintained even when the potential of the power ground terminal PGND varies due to the disconnection of the ground harness 320.

It will be appreciated that the present invention is not limited to the configurations described above, but any and all modifications, variations or equivalents, which may occur to those who are skilled in the art, should be considered to fall within the scope of the present invention.

For example, in the above embodiment, considering the input-output circuit 9 connected to the power ground terminal PGND, the level shift circuit 94 and the input protection circuit 95 are provided. However, the UVW phase driver 3A, the XYZ phase driver 3B, and the H-bridge driver 6 also have lines to which voltage of the power ground terminal PGND is directly applied via the current detection resistor 32 (FIG. 2) and the current detection resistor 54 (FIG. 3). Hence, it is desirable that the lines are provided with the level shift circuit 94 and the input protection circuit 95 to perform similar protect.

In addition, in the above embodiment, the rotary electric machine 100 for a vehicle operating as ISG is described. However, the present invention can be applied to a rotary electric machine for a vehicle which performs one of motor operation and generation operation.

In addition, in the above embodiment, two stator windings 1A, 1B and two MOS module groups 3A, 3B are provided. However, the present invention can be applied to a rotary electric machine for a vehicle including one stator winding 1A and one rectifier module group 3A and a rotary electric machine for a vehicle including three or more stator windings and three or more MOS modules.

As described above, according to the embodiment, the potential of the first ground terminal (power ground terminal) grounding the power system circuits is monitored with reference to the potential of the second terminal (control ground terminal) grounding the control system circuits. Hence, even when the power ground terminal and the control ground terminal are separately grounded, the disconnection of the power ground terminal can be detected.

Third Embodiment

The rotary electric machine 100 of the second embodiment has the same configuration as that of the rotary electric machine 100 described in the first embodiment.

According to the rotary electric machine 100 for a vehicle of the third embodiment, if the control ground terminal CGND grounding control system circuits is disconnected, the potential thereof shifts by the forward voltage of the diode 11. Hence, by monitoring the potential of another portion with reference to the potential of the control ground terminal CGND, the disconnection of the control ground terminal CGND can be detected. Specifically, monitoring the potential of another portion is required, but detecting the current flowing through the control ground terminal CGND is not required. Hence, the disconnection of the control ground terminal CGND can be detected by a simple configuration.

In addition, a specific portion is the power ground terminal PGND. The CGND disconnection detection section 82 detects the disconnection of the control ground terminal CGND based on the potential of the power ground terminal PGND when conducting electricity through the power ground terminal PGND. Specifically, when the variation range of the potential of the power ground terminal PGND is displaced from the range in normal time, that is, a normal range when the control ground terminal CGND is not disconnected, the CGND disconnection detection section 82 detects the disconnection of the control ground terminal CGND. By monitoring the potential variation (displacement of variation range) of the power ground terminal PGND when current is flowing to the power system circuits, presence or absence of the variation of the potential of the control ground terminal CGND can be reliably found, and the disconnection of the control ground terminal CGND can be precisely detected.

Alternatively, the specific portion is the ISG frame 110 connected to the cathode of the diode 11. The CGND disconnection detection section 82 detects the disconnection of the control ground terminal CGND when the potential of the ISG frame 110 connected to the cathode of the diode 11 is changed by the forward voltage of the diode 11, the disconnection of the control ground terminal CGND is detected. If the control ground terminal CGND is displaced, the relative potential at the side of the cathode of the diode 11 varies with reference to the potential of the disconnection of the control ground terminal CGND. Hence, the disconnection of the control ground terminal CGND can be precisely detected based on presence or absence of the variation of the potential.

In addition, when the CGND disconnection detection section 82 detects the disconnection of the ground cable 330, the CGND disconnection notification section 83 notifies the disconnection of the ground cable 330 to the ECU 600. Hence, the ECU 600 can notify occurrence of a malfunction to prompt the driver to quickly take measures, such as inspection, repair and replacement.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

The rotary electric machine for a vehicle includes a power system circuit (3A, 3B, 5) and a control system circuit (4A, 4B, 6, 7, 8, 9). The power system circuit (3A, 3B, 5) has a power element (30, 31, 50, 51) and is grounded via a first ground terminal and a first connecting line (320). The control system circuit (4A, 4B, 6, 7, 8, 9) controls the power system circuit and is grounded via a second ground terminal and a second connecting line (330).

According to the rotary electric machine for a vehicle of the embodiment, the first ground terminal for grounding the power system circuit and the second ground terminal for grounding the control system circuit are separated. Hence, even when the first ground terminal and the second ground terminal are disconnected, current can be reliably prevented from flowing from the power system circuit to the control system circuit.

The rotary electric machine for a vehicle includes a power system circuit (3A, 3B, 5), a control system circuit (4A, 4B, 6, 7, 8, 9), and a connecting line disconnection detection section (86). The power system circuit (3A, 3B, 5) has a power element (30, 31, 50, 51) and is grounded via a first ground terminal and a first connecting line (320). The control system circuit controls the power system circuit and is grounded via a second ground terminal and a second connecting line (330). The connecting line disconnection detection section monitors a potential of the first ground terminal with reference to a potential of the second ground terminal, and detects disconnection of the first connecting line when potential difference between the first ground terminal and the second ground terminal exceeds a first voltage range.

According to the rotary electric machine for a vehicle of the embodiment, the potential of the first ground terminal (power ground terminal) grounding the power system circuit is monitored with reference to the potential of the second ground terminal (control ground terminal) grounding the control system circuit. Hence, even when the power ground terminal and the control ground terminal are individually grounded, the disconnection of the power ground terminal can be detected.

The rotary electric machine for a vehicle includes a power system circuit (3A, 3B, 5), a control system circuit (4A, 4B, 6, 7, 8, 9), a diode (11), and a connecting line disconnection detection section (86). The power system circuit has a power element (30, 31, 50, 51) and is grounded via a first ground terminal and a first connecting line (320). The control system circuit controls the power system circuit and is grounded via a second ground terminal and a second connecting line (330). The diode is disposed between the first ground terminal and the second ground terminal so as to interrupt a current flowing from the first ground terminal to the second ground terminal. The connecting line disconnection detection section monitors a potential of another portion with reference to a potential of the second ground terminal, and detects disconnection of the second connecting line from the second ground terminal based on the amount of variation of the potential of the another portion.

According to the rotary electric machine for a vehicle of the embodiment, if the second ground terminal (control ground terminal) grounding the control system circuit is disconnected, the potential thereof shifts by forward voltage of the diode. Hence, by monitoring the potential of another portion with reference to the potential of the control ground terminal, the disconnection of the control ground terminal can be detected. Specifically, monitoring the potential of another portion is required, but detecting the current flowing through the control ground terminal is not required. Hence, the disconnection of the control ground terminal can be detected by a simple configuration.

What is claimed is:

1. A rotary electric machine for a vehicle, comprising:
a power system circuit comprising a power element, the power system circuit being grounded via a first ground terminal and a first connecting line;
a control system circuit, wherein the control system circuit controls the power system circuit and is grounded via a second ground terminal which differs from the first ground terminal and a second connecting line which differs from the first connecting line, wherein the control system circuit comprises:
a connecting line disconnection detection section that monitors a potential of the first ground terminal with reference to a potential of the second ground terminal to detect disconnection of the first connecting line from the first ground terminal and disconnection of the second connecting line from the second ground terminal; and
a notification section that notifies the disconnection to an external unit by communication using a CAN protocol or a LIN protocol when the connecting line disconnection detection section detects disconnection of the first connecting line or the second connecting line;
a diode which is disposed between the first ground terminal and the second ground terminal so as to

19 interrupt a current flowing from the first ground terminal to the second ground terminal;
a power converter which converts AC voltage, which is induced in a stator winding included in a stator, into DC voltage, or converts DC voltage, which is applied from an external unit, into AC voltage, to apply the converted voltage to the stator winding, and
an exciting circuit which supplies an exciting current to a field winding included in a rotor, wherein
the power converter and the exciting circuit are grounded via the first ground terminal and the first connecting line, and
the first voltage range, which is used for detecting disconnection of a connecting line by the connecting line disconnection detection section, is set to a range of ±1.4 V with reference to a potential of the second ground terminal.

2. The rotary electric machine according to claim 1, wherein
one end of the diode is connected to the second ground terminal, and the other end of the diode is indirectly connected to the first ground terminal via a frame ground terminal.

3. The rotary electric machine according to claim 1, wherein
the first ground terminal is connected to a vehicle frame, and the second ground terminal is connected to the vehicle frame via the diode.

4. The rotary electric machine according to claim 3, wherein
the diode is connected to the vehicle frame via a rotary electric machine frame and an engine block.

5. The rotary electric machine according to claim 1, wherein
a current common to the stator windings or a field winding flows through the power element.

6. The rotary electric machine according to claim 1, wherein
the power system circuit is connected to a high-voltage battery and a high-voltage load, and
the control system circuit is connected to a low-voltage battery and a low-voltage load.

7. The rotary electric machine according to claim 1, wherein
the control system circuit has a first protection section which short-circuits a phase winding included in the stator winding when the connecting line disconnection detection section detects disconnection of a connecting line.

8. The rotary electric machine according to claim 7, wherein
the power converter has a bridge circuit including a plurality of high-side first switching elements and a plurality of low-side second switching elements, and
the first protection section turns off the first switching elements and turns on the second switching elements.

9. The rotary electric machine according to claim 1, wherein
the control system circuit has a second protection section which stops supply of the exciting circuit to the field winding when the connecting line disconnection detection section detects disconnection of a connecting line.

10. The rotary electric machine according to claim 1, wherein
the control system circuit has a notification section which notifies the fact that the connecting line disconnection

20 detection section has detected disconnection of a connecting line to an external unit.

11. The rotary electric machine according to claim 1, wherein
the power system circuit is connected to a first battery, and the control system circuit is connected to a second battery.

12. The rotary electric machine according to claim 11, wherein
terminal voltage of the first battery is higher than terminal voltage of the second battery.

13. The rotary electric machine according to claim 1, wherein
the connecting line disconnection detection section detects disconnection of the second connecting line from the second ground terminal based on the potential of the first ground terminal when conducting electricity through the first ground terminal.

14. The rotary electric machine according to claim 1, wherein
the control system circuit has a notification section which notifies the fact that the connecting line disconnection detection section has detected disconnection of a connecting line to an external unit.

15. The rotary electric machine according to claim 14, wherein the connecting line is a ground cable.

16. A rotary electric machine for a vehicle, comprising:
a power system circuit comprising a power element, the power system circuit being grounded via a first ground terminal and a first connecting line;
a control system circuit, wherein the control system circuit controls the power system circuit and is grounded via a second ground terminal which differs from the first ground terminal and a second connecting line which differs from the first connecting line, wherein the control system circuit comprises:
 a connecting line disconnection detection section that monitors a potential of the first ground terminal with reference to a potential of the second ground terminal to detect disconnection of the first connecting line from the first ground terminal and disconnection of the second connecting line from the second ground terminal; and
 a notification section that notifies the disconnection to an external unit by communication using a CAN protocol or a LIN protocol when the connecting line disconnection detection section detects disconnection of the first connecting line or the second connecting line;
a diode which is disposed between the first ground terminal and the second ground terminal so as to interrupt a current flowing from the first ground terminal to the second ground terminal;
a power converter which converts AC voltage, which is induced in a stator winding included in a stator, into DC voltage, or converts DC voltage, which is applied from an external unit, into AC voltage, to apply the converted voltage to the stator winding, and
an exciting circuit which supplies an exciting current to a field winding included in a rotor, wherein
the power converter and the exciting circuit are grounded via the first ground terminal and the first connecting line, and
at least one of the power system circuit and the control system circuit has an input protection circuit which restrains variation a potential of a line connected to the first ground terminal within a second voltage range wider than the first voltage range.

* * * * *